(12) United States Patent
Fukuyasu et al.

(10) Patent No.: US 9,937,550 B2
(45) Date of Patent: Apr. 10, 2018

(54) METHOD OF MANUFACTURING DIE FORGED CRANKSHAFT

(71) Applicant: NIPPON STEEL & SUMITOMO METAL CORPORATION, Tokyo (JP)

(72) Inventors: Tomihiko Fukuyasu, Tokyo (JP); Nobutaka Tanimoto, Fostoria, OH (US); Junichi Okubo, Amagasaki (JP); Kunihiro Yoshida, Nishinomiya (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 574 days.

(21) Appl. No.: 14/597,307

(22) Filed: Jan. 15, 2015

(65) Prior Publication Data
US 2015/0128416 A1    May 14, 2015

Related U.S. Application Data

(63) Continuation of application No. PCT/JP2012/004796, filed on Jul. 27, 2012.

(51) Int. Cl.
*B21K 1/08*    (2006.01)
*F16C 3/08*    (2006.01)
(Continued)

(52) U.S. Cl.
CPC .............. *B21K 1/08* (2013.01); *B21J 5/025* (2013.01); *B21J 5/027* (2013.01); *B21J 5/08* (2013.01);
(Continued)

(58) Field of Classification Search
CPC ..... B21K 1/08; B21J 5/08; B21J 5/025; B21J 5/027; F16C 3/08; F16C 2220/46; Y10T 29/49286
See application file for complete search history.

(56) References Cited

U.S. PATENT DOCUMENTS 3,713,320 A * 1/1973 Andresen .................... B21J 5/00
72/361
4,094,048 A    6/1978 Broder

FOREIGN PATENT DOCUMENTS

JP    53-048046    5/1978
JP    58-215237    12/1983
(Continued)

OTHER PUBLICATIONS

Machine Translation of Nagura, JPS6160236, dated Mar. 1986.*

*Primary Examiner* — Ryan J Walters
(74) *Attorney, Agent, or Firm* — Clark & Brody (57) ABSTRACT

A method of manufacturing a die forged crankshaft to be mounted in a two or more cylinder reciprocating apparatus includes: an upsetting step that includes upsetting a billet having a constant cross-sectional area along an entire length thereof to form a blank having an enlarged cross-sectional area at a region between a portion to be formed into a leading crank arm of the crankshaft and a portion to be formed into a trailing crank arm thereof; a die forging step that includes die forging the blank formed in the upsetting step to form a forged blank having a shape of the crankshaft with a flash; and a trimming step that includes trimming the flash from the forged blank formed in the die forging step. This makes it possible to improve the material utilization and to use a billet having a cross-sectional size as small as possible.

4 Claims, 7 Drawing Sheets

(51) Int. Cl.
*B21J 5/02* (2006.01)
*B21J 5/08* (2006.01)
(52) U.S. Cl.
CPC ............ *F16C 3/08* (2013.01); *F16C 2220/46* (2013.01); *Y10T 29/49286* (2015.01)

(56) References Cited

FOREIGN PATENT DOCUMENTS

| JP | 61-60236 | 3/1986 |
|---|---|---|
| JP | 02-104437 | 4/1990 |
| JP | 05-228574 | 9/1993 |
| JP | 08-24988 | 1/1996 |
| JP | 2000-094087 | 4/2000 |
| JP | 2003-326332 | 11/2003 |

* cited by examiner

METHOD OF MANUFACTURING DIE FORGED CRANKSHAFT

TECHNICAL FIELD

The present invention relates to a method of manufacturing a crankshaft product by hot die forging (hereinafter referred to as a "die forged crankshaft"). In particular, the present invention relates to a method of manufacturing a die forged crankshaft to be mounted in a two or more cylinder reciprocating apparatus (e.g., an automotive reciprocating engine, a reciprocating compressor, and a reciprocating pump).

BACKGROUND ART

A crankshaft is a principal component of a reciprocating engine, which produces power by converting reciprocating motion of pistons to rotary motion. Generally, there are two types of crankshafts: one that is manufactured by die forging and one that is manufactured by casting. For engines of automobiles such as passenger cars, freight cars, and specialized work vehicles, particularly multiple cylinder engines having two or more cylinders, it is necessary that their crankshafts have high strength and stiffness, and therefore die forged crankshafts are widely used. For engines of motorcycles, agricultural machines, and marine vessels, die forged crankshafts are also used. Further, for reciprocating compressors and reciprocating pumps, in which power transmission occurs in a reverse direction to that of a reciprocating engine, i.e., rotary motion is converted to reciprocating motion, die forged crankshafts are also used.

In general, as described in Patent Literatures 1 and 2, for example, die forged crankshafts for use in such reciprocating apparatus are manufactured in the following manner a billet having a circular or square cross section and having a constant cross-sectional area along the entire length is prepared as a starting material, and the billet is subjected to the steps of preforming, die forging, trimming and coining in order. The preforming step includes roll forming and bend forging, and the die forging step includes block forging and finish forging.

Figure 1:
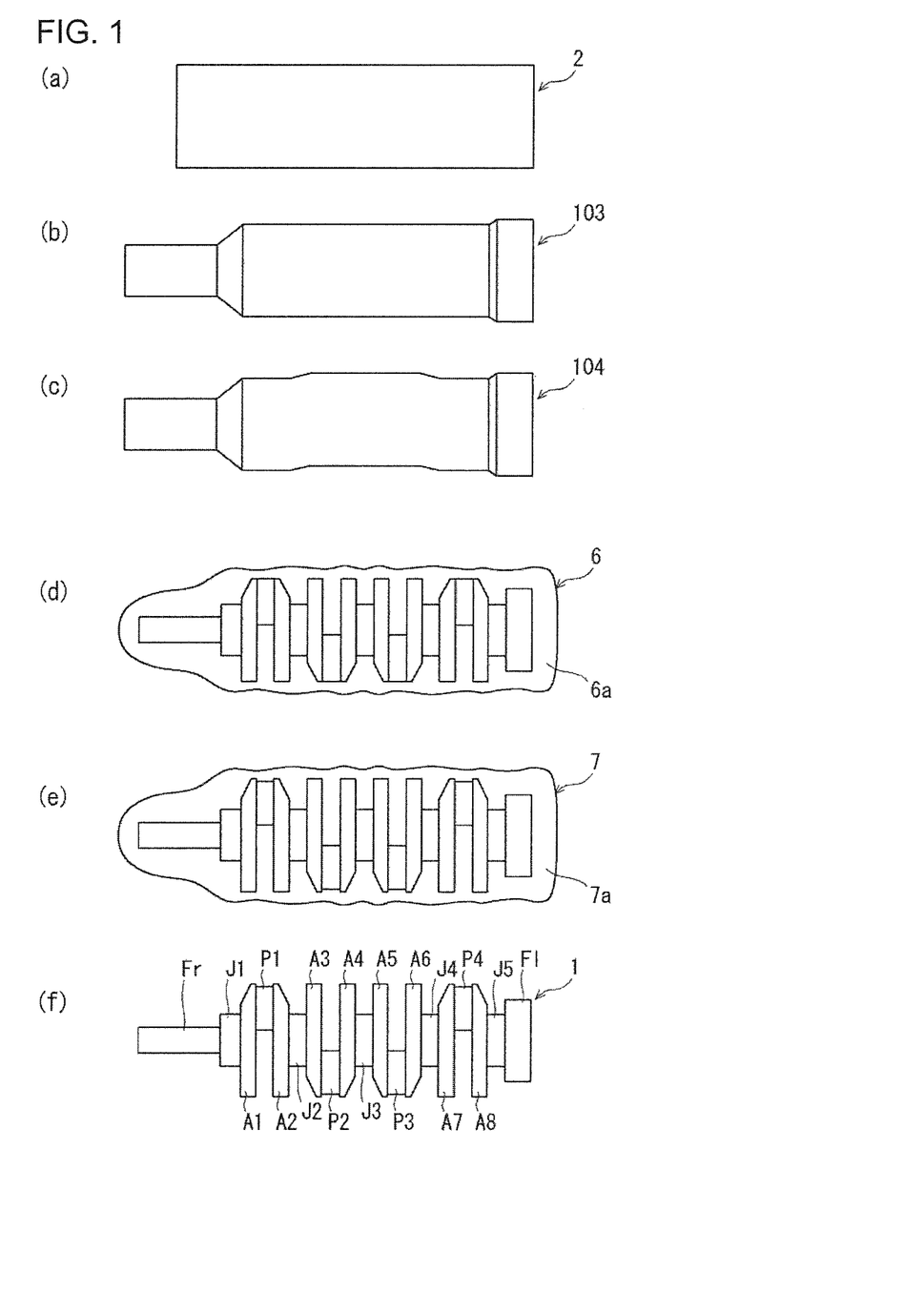
FIG. 1 is a diagram schematically showing a typical conventional process for manufacturing a die forged crankshaft.

FIG. 1 is a diagram schematically showing a typical conventional process for manufacturing a die forged crankshaft. A crankshaft 1 illustrated in FIG. 1 is intended to be mounted in a 4-cylinder engine. It is a 4-cylinder 8-counterweight crankshaft that includes: five journals J1 to J5; four crank pins P1 to P4; a front part Fr, a flange Fl, and eight crank arms (hereinafter referred to as "crank arms") A1 to A8 that connect the journals J1 to J5 and the crank pins P1 to P4 to each other, wherein each of the eight crank arms A1 to A8 has a balance weight. Hereinafter, when the journals J1 to J5, the crank pins P1 to P4, and the crank arms A1 to A8 are each collectively referred to, a reference character "J" is used for the journals, a reference character "P" for the crank pins, and a reference character "A" for the crank arms.

In the manufacturing method shown in FIG. 1, a billet 2 shown in FIG. 1(a), which has been previously cut to a predetermined length, is heated by an induction heater or a gas atmosphere furnace and then is subjected to roll forming. In the roll forming step, the billet 2 is rolled and reduced in cross-section by grooved rolls, for example, to distribute its volume in the longitudinal direction, whereby a rolled blank 103, which is an intermediate material, is formed (see FIG. 1(b)). In the bend forging step, the rolled blank 103 obtained by roll forming is partially pressed in a press in a direction perpendicular to the longitudinal direction to distribute its volume, whereby a bent blank 104, which is a secondary intermediate material, is formed (see FIG. 1(c)).

In the block forging step, the bent blank 104 obtained by bend forging is press forged with a pair of upper and lower dies, whereby a forged blank 6 having a general shape of a crankshaft (forged product) is formed (see FIG. 1(d)). Furthermore, in the finish forging step, the block forged blank 6 obtained by block forging is press forged with a pair of upper and lower dies, whereby a forged blank 7 having a shape that corresponds to the shape of the crankshaft is formed (see FIG. 1(e)). In the block forging and the finish forging, excess material flows out as a flash from between the parting surfaces of the dies that oppose each other. Thus, the block forged blank 6 and the finish forged blank 7 include flashes 6a, 7a, respectively, around the formed shape of the crankshaft.

In the trimming step, the finish forged blank 7 with the flash 7a, obtained by finish forging, is held by dies from above and below and the flash 7a is trimmed by a cutting die. In this manner, a die forged crankshaft 1 is obtained as shown in FIG. 1(f). In the coining step, principal parts of the die forged crankshaft 1, from which the flash has been removed, e.g., shaft parts such as the journals J, the crank pins P, the front part Fr, and the flange Fl, and in some cases the crank arms A, are slightly pressed with dies from above and below and formed into a desired size and shape. In this manner, the die forged crankshaft is manufactured.

The manufacturing process shown in FIG. 1 is applicable not only to a 4-cylinder 8-counterweight crankshaft as exemplified, but also to a 4-cylinder 4-counterweight crankshaft in which, among 8 crank arms A, the leading crank arm A1, the trailing crank arm A8, and the two central crank arms A4, A5 have balance weights. Also, the same manufacturing process can be applied to crankshafts that are to be mounted in a 3-cylinder engine, an inline 6-cylinder engine, a V-type 6-cylinder engine, an 8-cylinder engine, and the like. It is noted that, when adjustment of the placement angle of the crank pins is necessary, a step of twisting is added after the trimming step.

CITATION LIST

Patent Literature

Patent Literature 1: Japanese Patent Application Publication No. H05-228574
Patent Literature 2: Japanese Patent Application Publication No. H08-24988

SUMMARY OF INVENTION

Technical Problem

Typically, a manufacturing process for a die forged crankshaft includes the steps of preforming (roll forming and bend forging), die forging (block forging and finish forging), trimming and coining as described above, and these steps are continuously performed in an online process. However, in some cases, the preforming step is eliminated. This is because rolling equipment that is used in the roll forming in the preforming step is dedicated equipment and has a complex structure on a large scale, and therefore an enormous cost will be required for the installation and management thereof. For comparison, the bend forging in the preforming step can be carried out in pressing equipment in which die forging (block forging and finish forging) is to be performed.

Figure 2:
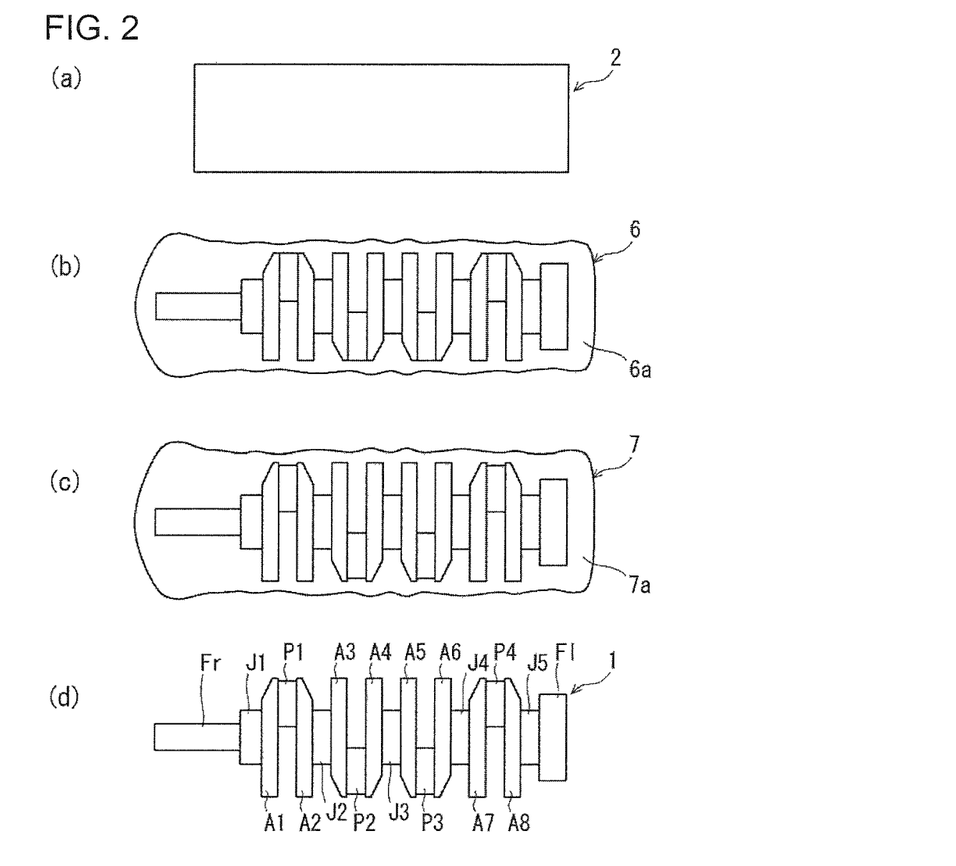
FIG. 2 is a diagram schematically showing a process for manufacturing a die forged crankshaft in which the preforming step is eliminated.

FIG. 2 is a diagram schematically showing a process for manufacturing a die forged crankshaft in which the preforming step is eliminated. When the preforming step is eliminated, die forging is carried out by directly block forging the billet 2 having a constant cross-sectional area along the entire length as shown in FIGS. 2(a) and 2(b).

Typically, the cross-sectional size of a billet to be used (in the case of a round billet, its diameter, and in the case of a square billet, the length of its side) is determined based on the maximum cross sectional area of the crankshaft to be manufactured as defined in a direction perpendicular to the longitudinal direction, i.e., the cross-sectional area of crank arms having a balance weight (counterweight). Thus, if the preforming step is eliminated in manufacturing a crankshaft, the material utilization is extremely reduced at portions to be formed into opposite end portions having small cross-sectional areas in the crankshaft, i.e., the front part, the flange, and the journals located adjacent thereto.

Furthermore, actual billets come in cross-sectional sizes that have been grouped into several classes. Thus, in the case of manufacturing a crankshaft without the preforming step, if an ideal billet cross-sectional size, which is determined based on the maximum cross-sectional area of the crankshaft to be manufactured, falls in between classes, it becomes necessary to use a billet of a class of a cross-sectional size greater than the ideal cross-sectional size. For example, assuming that a round billet is used, if an available size class that is next larger than a size class of 90 mm diameter is a size class of 95 mm diameter while the ideal cross-sectional size is 93 mm in diameter, which is in between the available size classes, it becomes necessary to employ a billet of the size class of 95 mm diameter, which is greater than the ideal cross-sectional size. This will result in further reducing the material utilization.

Furthermore, crankshafts are provided in different sizes and shapes depending on the type of engine. Thus, the billet cross-sectional size is varied in accordance with the size and shape of each crankshaft to be manufactured, and thus is in a wide variety from a small one to a large one. Moreover, when an induction heater is used to heat the billet, it is necessary to prepare and install, each time, an electromagnetic coil of a suitable size in accordance with the cross-sectional size of the billet to be used.

The present invention has been made in view of the foregoing problems. Accordingly, it is an object of the present invention to provide a method of manufacturing a die forged crankshaft for use in a multiple cylinder reciprocating apparatus whereby it is possible to improve the material utilization and to use a billet having a cross-sectional size as small as possible.

Solution to Problem

In order to achieve the above object, the present inventors turned their attention to the step of forming a blank, which affects the material utilization, among the steps for manufacturing a die forged crankshaft, and they conducted intensive studies thereon. Consequently, they have found that it is advantageous to perform an upsetting operation, prior to die forging (block forging and finish forging), to upset a billet in the longitudinal direction to prepare a blank having the following configuration (hereinafter also referred to as an "upset blank"): at opposite end portions, i.e. portions to be formed into a front part, a flange and journals located adjacent thereto of a crankshaft, the cross-sectional size of the billet is maintained, while, at the remaining intermediate region, i.e., at the region between a portion to be formed into a leading crank arm of the crankshaft and a portion to be formed into a trailing crank arm thereof, the cross-sectional area is enlarged, and to die forge such an upset blank.

The present invention has been accomplished based on this finding, and the summaries thereof are set forth below as to a method of manufacturing a die forged crankshaft. That is, there is provided a method of manufacturing a die forged crankshaft to be mounted in a multiple cylinder reciprocating apparatus, the method comprising: an upsetting step that includes upsetting a billet having a constant cross-sectional area along an entire length thereof to form a blank having an enlarged cross-sectional area at a region between a portion to be formed into a leading crank air of the crankshaft and a portion to be formed into a trailing crank arm of the crankshaft; a die forging step that includes die forging the blank formed in the upsetting step to form a forged blank having a shape of the crankshaft with a flash; and a trimming step that includes trimming the flash from the forged blank formed in the die forging step.

This method of manufacturing a die forged crankshaft is useful when the crankshaft is intended for use in a multiple cylinder engine having two or more cylinders. When the crankshaft includes a disc-shaped crank arm that is coaxial with the central axis of itself, the upsetting step may be performed in such a manner that the blank has a portion to be formed into the disc-shaped crank arm, the portion having a further enlarged cross sectional area.

These methods of manufacturing a die forged crankshaft may include a preforming step prior to the die forging step, the preforming step including: partially pressing the blank in accordance with the shape of the crankshaft and distributing the volume of the blank at least in a longitudinal direction thereof, of the longitudinal direction and a direction perpendicular to the longitudinal direction.

Advantageous Effects of Invention

According to a method of manufacturing a die forged crankshaft of the present invention, an upsetting operation is applied to a billet having a cross-sectional size smaller than an ideal cross-sectional size that is determined based on the maximum cross-sectional area of a crankshaft to be manufactured, and with this, it is possible to form an upset blank having an ideally enlarged cross-sectional area at an intermediate region including portions which will become portions of the maximum cross-sectional area in the crankshaft to be manufactured, while having cross-sectional areas maintained to be small at the opposite end portions, which will become portions of small cross-sectional areas in the crankshaft to be manufactured. Since die forging is applied to such an upset blank, it is possible to improve the material utilization along the entire length of the crankshaft and also to use a billet having a cross-sectional size as small as possible.

DESCRIPTION OF EMBODIMENTS

Hereinafter, embodiments of the method of manufacturing a die forged crankshaft of the present invention are described in detail.

Figure 3:
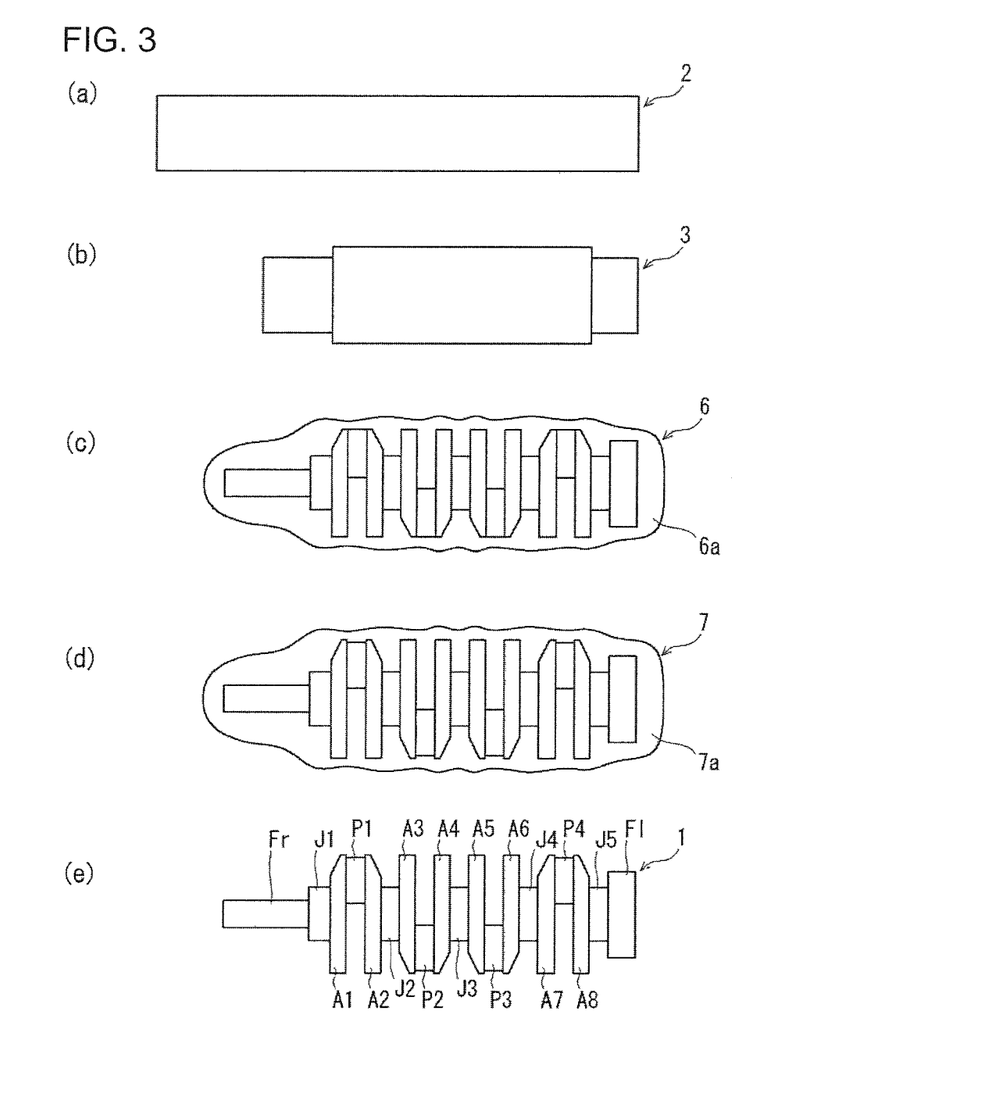
FIG. 3 is a diagram schematically showing an exemplary process for manufacturing a die forged crankshaft according to a method of the present invention.

FIG. 3 is a diagram schematically showing an exemplary process for manufacturing a die forged crankshaft according to a method of the present invention. The crankshaft illustrated in FIG. 3 is a 4-cylinder 8-counterweight crankshaft. The manufacturing process therefor includes the steps of upsetting, die forging (block forging and finish forging), trimming and coining, using as a starting material a billet 2 having a circular or square cross section and having a constant cross-sectional area along the entire length.

In the method of manufacturing a die forged crankshaft of the present invention, a billet 2 shown in FIG. 3(a), which has been previously cut to a predetermined length, is heated by an induction heater or a gas atmosphere furnace, and then an upsetting operation is performed on the billet. In the upsetting step, as detailed later, an upsetting operation is performed to upset the billet 2 in the longitudinal direction, whereby a blank 3, which is an intermediate material, is formed (see FIG. 3(b)). This upset blank 3 has such a configuration that: at opposite end portions, i.e. portions to be formed into a front part Fr, a flange Fl and journals J1, J5 located adjacent thereto of the crankshaft 1, the cross-sectional size of the billet 2 is maintained to the extent possible, while, at the remaining intermediate region, i.e., at the region between a portion to be formed into a leading crank arm A1 of the crankshaft 1 and a portion to be formed into a trailing crank arm A8 thereof, the cross-sectional area is enlarged.

The enlargement of the cross-sectional area of the intermediate region in the upset blank 3 is carried out by the upsetting operation in such a manner that the cross-sectional area necessary for the crank arms A is ensured in the crankshaft 1 to be manufactured.

In the block forging step, the upset blank 3 obtained by the upsetting operation is press forged with a pair of upper and lower dies, whereby a forged blank 6 with a flash 6a having a general shape of the crankshaft (forged product) is formed (see FIG. 3(c)). Furthermore, in the finish forging step, the block forged blank 6 obtained by block forging is press forged with a pair of upper and lower dies, whereby a forged blank 7 with a flash 7a having a shape that corresponds to the shape of the crankshaft is formed (see FIG. 3(d)).

In the trimming step, the finish forged blank 7 with the flash 7a, obtained by finish forging, is held by dies from above and below and the flash 7a is trimmed by a cutting die. In this manner, a die forged crankshaft 1 as shown in FIG. 3(e) is obtained. In the coining step, principal parts of the die forged crankshaft 1 from which the flash has been removed are slightly pressed with dies from above and below, so that it is formed into a desired size and shape. In this manner, the die forged crankshaft is manufactured.

Such a method of manufacturing a die forged crankshaft of the present invention is capable of achieving the following. For example, assuming that a round billet is used and an available size class that is next larger than a size class of 90 mm diameter is a size class of 95 mm diameter, even if an ideal cross-sectional size that is determined based on the maximum cross-sectional area of a crankshaft to be manufactured is 93 mm in diameter, which falls in between the available size classes, a billet of the smaller size class of 90 mm diameter can be employed or a billet of an even smaller size class of 85 mm diameter can be employed because an upsetting operation is applied to such a billet having a smaller cross-sectional size, which makes it possible to form an upset blank having an ideally enlarged cross-sectional area at an intermediate region including portions which will become portions of the maximum cross-sectional area in the crankshaft to be manufactured, while having cross-sectional areas maintained to be small at the opposite end portions, which will become portions of small cross-sectional areas in the crankshaft to be manufactured. Since die forging is applied to such an upset blank, it is possible to improve the material utilization along the entire length of the crankshaft.

Also, the cross-sectional size of the billet to be used is not restricted by the maximum cross-sectional area of the crankshaft to be manufactured, and therefore it is possible to use a billet having a size as small as possible. Thus, when an induction heater is used to heat the billet, the electromagnetic coil to be installed can also be as small as possible.

The manufacturing process shown in FIG. 3 is applicable not only to a 4-cylinder 8-counterweight crankshaft as exemplified, but also to a 4-cylinder 4-counterweight crankshaft and moreover crankshafts that are to be mounted in a 3-cylinder engine, an inline 6-cylinder engine, a V-type 6-cylinder engine, an 8-cylinder engine, and the like. Further, the manufacturing process is applicable to manufacturing of crankshafts not only for automotive engines but also of those to be mounted in a variety of reciprocating apparatus such as engines of motorcycles, agricultural machines, and marine vessels, and also reciprocating compressors and reciprocating pumps. It is noted that, when adjustment of the placement angle of the crank pins is necessary, a step of twisting is added after the trimming step.

The method of manufacturing a die forged crankshaft of the present invention is useful when the crankshaft is intended for use in a multiple cylinder engine having two or more cylinders. Also, the method of manufacturing a die forged crankshaft of the present invention is suitable when a round billet is used. This is because, with a round billet, enlargement of the cross-sectional area can be achieved more steadily during the upsetting operation than with a square billet.

It is to be noted that automotive engines sometimes include a balance shaft in order to prevent vibration and noise. A balance shaft is driven by a ring gear mounted on one of crank arms of a crankshaft. In such a case, the crankshaft includes a disc-shaped crank arm that is coaxial with the central axis of itself for attachment of a ring gear. This disc-shaped crank arm is much larger than the other crank arms, and has the largest cross-sectional area among the components of the crankshaft.

In the case of manufacturing such a die forged crankshaft having a disc-shaped crank arm, the manufacturing process shown in FIG. 3 is again applicable. In this case, however, the upsetting step of the manufacturing process may be performed in such a manner that the cross-sectional area of the intermediate region of the upset blank is further enlarged at a portion to be formed into the disc-shaped crank arm.

Figure 4:
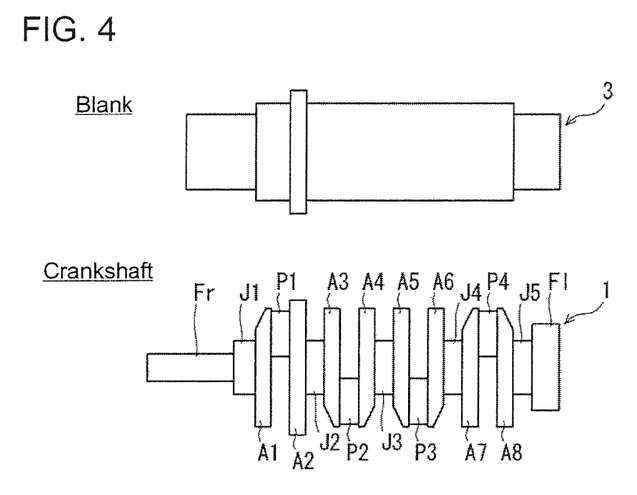
FIG. 4 is a diagram schematically showing the shapes of an upset blank and a crankshaft in the case of manufacturing a die forged crankshaft having a disc-shaped crank arm.

FIG. 4 is a diagram schematically showing the shapes of an upset blank and a crankshaft in the case of manufacturing a die forged crankshaft having a disc-shaped crank arm. In the crankshaft 1 illustrated in FIG. 4, the crank arm A2, which is the second from the leading crank arm, is disc-shaped. The upset blank 3 which is to be used in die forging of this crankshaft 1 has such a configuration, obtained by upsetting a billet, that: at opposite end portions, the cross-sectional size of the billet is maintained, while, at the inter mediate region between a portion to be formed into a leading crank arm A1 of the crankshaft 1 and a portion to be formed into a trailing crank arm A8 thereof, the cross-sectional area is enlarged, and moreover, at a portion, in the inter mediate region, to be formed into the disc-shaped crank arm A2, the cross-sectional area is further enlarged. That is, the upset blank 3 in this case has two stages of enlarged cross sectional, areas.

In the upset blank 3, the cross-sectional area of the portion to be formed into the disc-shaped crank arm A2 is configured so that the cross-sectional area necessary for the disc-shaped crank arm A2 is ensured in the crankshaft 1 to be manufactured. The cross-sectional area of the remaining intermediate region of the upset blank 3 is configured so that the cross-sectional area necessary for the crank arms A other than the disc-shaped crank arm A2 is ensured.

When die forging is applied to such an upset blank 3, it is possible to manufacture a crankshaft with an improved material utilization along the entire length even if it is a crankshaft having a disc-shaped crank arm A2.

As described above, the manufacturing process shown in FIG. 3 is applicable to manufacturing of die forged crankshafts to be mounted in a variety of automotive engines. However, in the case of crankshafts including oval-shaped crank arms without a balance weight, e.g., a 4-cylinder 4-counterweight crankshaft, a crankshaft that is to be mounted in a V-type 6-cylinder engine, and the like, since such oval-shaped crank arms have a small cross-sectional area, the manufacturing process shown in FIG. 3 is not sufficient to improve the material utilization at portions to be formed into the oval-shaped crank arms. To address this, in the manufacturing process shown in FIG. 3, preforming for further deforming the upset blank may be carried out prior to die forging depending on the shape of the crankshaft to be manufactured.

Figure 5:
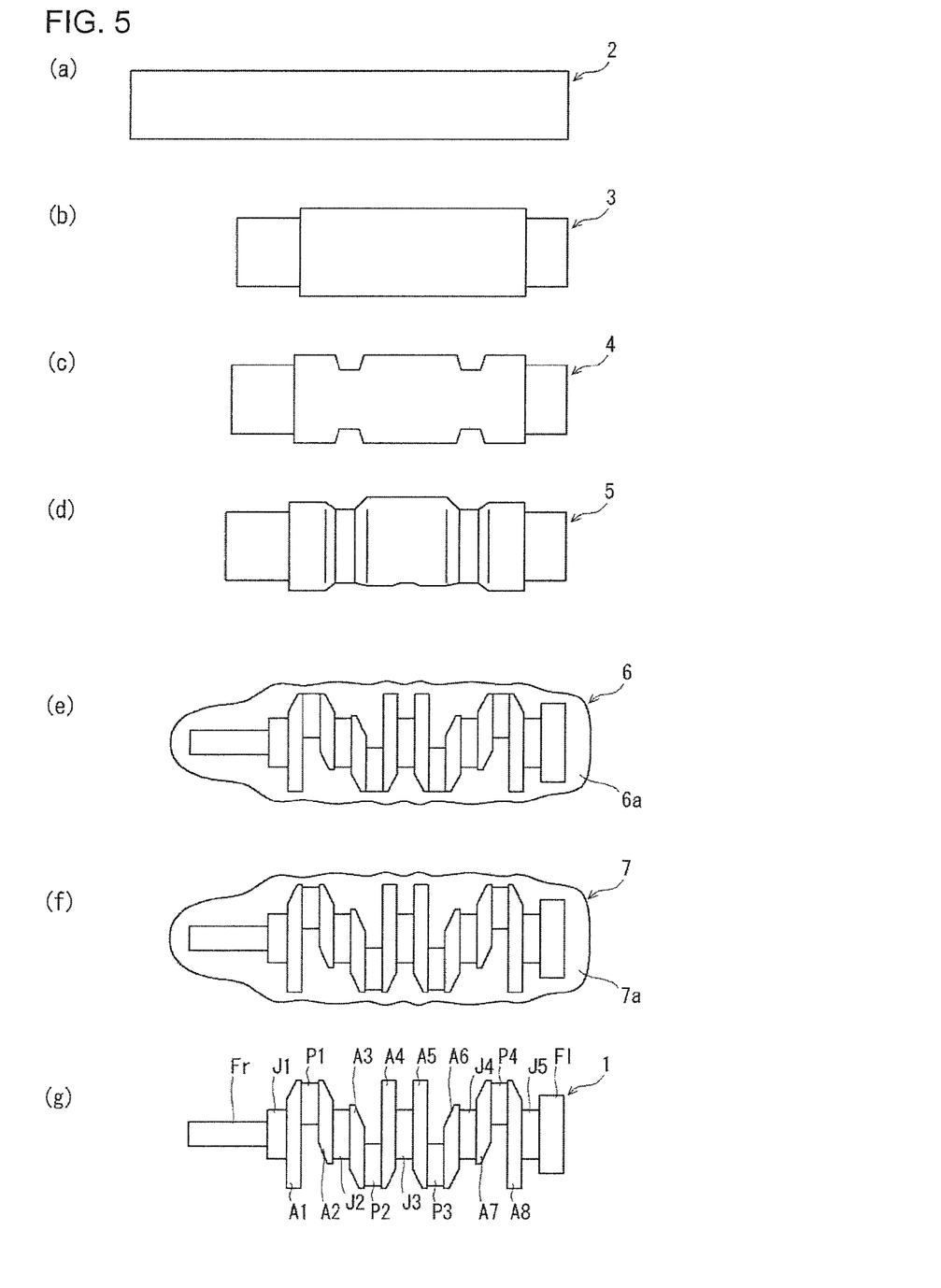
FIG. 5 is a diagram schematically showing a variation of the process for manufacturing a die forged crankshaft according to a method of the present invention.

FIG. 5 is a diagram schematically showing a variation of the process for manufacturing a die forged crankshaft according to a method of the present invention. The crankshaft 1 illustrated in FIG. 5 is a 4-cylinder 4-counterweight crankshaft in which the second, third, sixth, and seventh crank arms A from the leading crank arm are oval-shaped (see FIG. 5(*g*)). The manufacturing process for this crankshaft 1 includes the steps of upsetting, preforming, die forging (block forging and finish forging), trimming and coining. That is, a preforming step is incorporated between the upsetting step and the die forging step in the manufacturing process shown in FIG. 3. The preforming step includes a first preforming step and a second preforming step.

In the first preforming step, using the pressing equipment in which the die forging is to be performed, the upset blank 3 shown in FIG. 5(*b*) obtained by the upsetting operation is partially pressed in the press in a direction perpendicular to the longitudinal direction, so that its volume is distributed in the longitudinal direction (see FIG. 5(*c*)). This pressing is applied to portions to be formed into oval-shaped crank arms A of the crankshaft.

In the subsequent second preforming step, using again the pressing equipment in which the die forging is to be performed, the upset blank 4 shown in FIG. 5(*c*) obtained by the first preforming step is partially pressed in the press in a direction perpendicular to the longitudinal direction in a state where it has been rotated by 90° about its central axis, so that its volume is distributed in the longitudinal direction and in the direction perpendicular to the longitudinal direction (see FIG. 5(*d*)). This pressing corresponds to the bend forging shown in FIG. 1(*c*).

Then, the upset blank 5 shown in FIG. 5(*d*) obtained by the second preforming step is subjected to die forging.

According to such a manufacturing method that is implemented by the manufacturing process shown in FIG. 5, the cross-sectional area of the upset blank 5 can be reduced, in accordance with the shape of the crankshaft 1 to be manufactured, at portions which will become portions of small cross-sectional areas in the crankshaft 1, e.g., at portions to be formed into oval-shaped crank arms A, and therefore it is possible to sufficiently improve the material utilization at such portions too.

Figure 6:
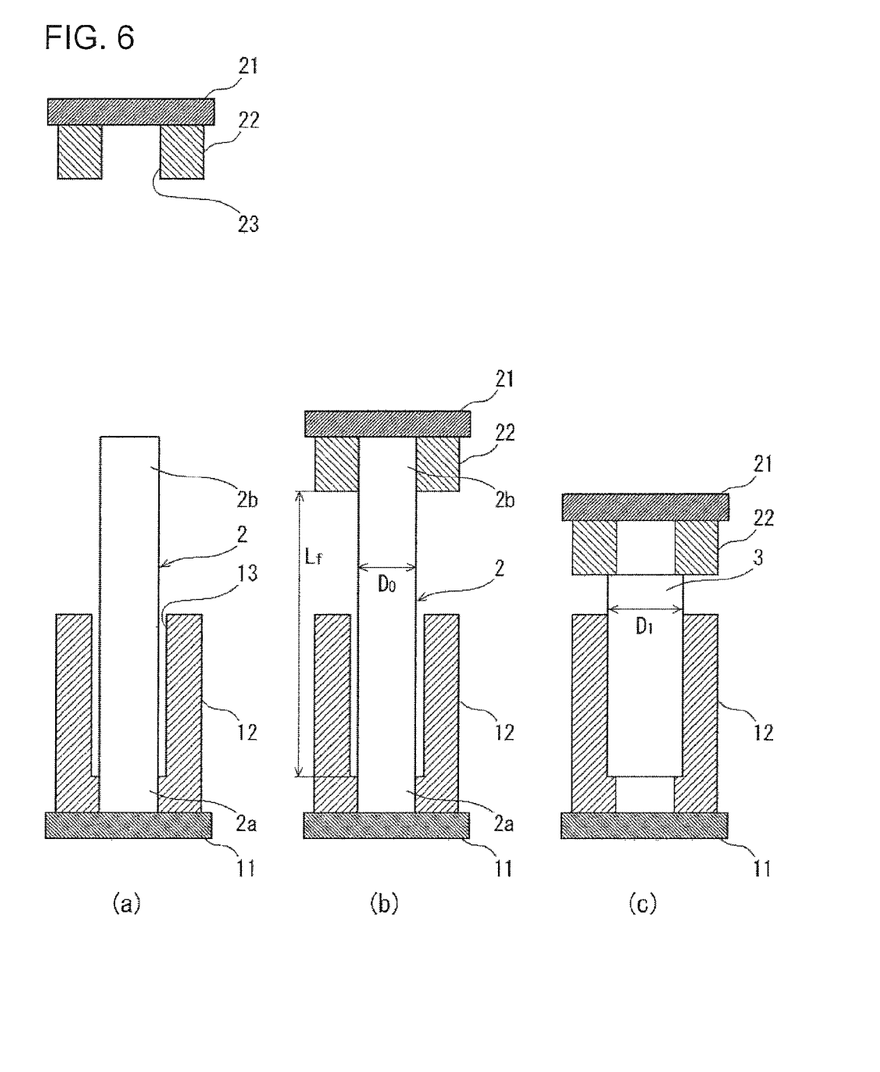
FIG. 6 is a diagram schematically showing an exemplary upsetting operation in a method of manufacturing a die forged crankshaft according to the present invention.

FIG. 6 is a diagram schematically showing an exemplary upsetting operation in a method of manufacturing a die forged crankshaft according to the present invention. The upsetting operation illustrated in FIG. 6 is intended to form the upset blank 3 shown in FIG. 3 having a region at which the cross-sectional area is uniformly enlarged.

When dedicated pressing equipment is used for the upsetting operation, examples of pressing equipment that is employable include a screw press, a hydraulic press, and a crank press. It is to be noted, though, that the upsetting operation is an operation for compressing a long billet in the longitudinal direction and it is performed in series with other steps in an online process, and therefore that the pressing equipment must be operable at high speed and have a longer stroke.

As shown in FIG. 6, the pressing equipment that is used for the upsetting operation includes a lower die 12 supported by a stationary pressure pad 11 which serves as a base and an upper die 22 supported by a pressure pad 21 which is movable in the vertical direction. The lower die 12 and the upper die 22 have die cavities 13, 23, respectively, which oppose each other.

The die cavity 13 of the lower die 12 is a stepped cavity having a bottom-side cavity portion and an opening-side cavity portion. The cross section of the bottom-side cavity portion of the die cavity 13 in the lower die 12 corresponds to the cross-sectional shape of the billet 2, and the cross section of the opening-side cavity portion corresponds to the cross-sectional shape of the intermediate region of a desired upset blank 3. On the other hand, the die cavity 23 of the upper die 22 is a simple opening having a cross section that corresponds to the cross-sectional shape of the billet 2. Strictly speaking, both the die cavities 13, 23 are configured such that their diameters slightly increase toward the opening sides. This is intended to avoid difficulties in inserting the billet 2 and removing the upset blank 3.

As shown in FIG. 6(*a*), in the upsetting operation, the billet 2 is inserted into the die cavity 13 of the lower die 12, and one end portion 2*a* of the billet 2 is restrained by the bottom-side cavity portion of the die cavity 13. Then, as shown in FIG. 6(*b*), when the upper die 22 is lowered, the other end portion 2*b* of the billet 2 is received by the die cavity 23 of the upper die 22, and the other end portion 2*b* of the billet 2 is restrained by the die cavity 23. As the upper die 22 is further lowered, the region of the billet 2 excluding both end portions 2a, 2b, which are restrained, is compressed in the longitudinal direction, and accordingly enlarged in a direction perpendicular to the longitudinal direction.

In this operation, with the adjustment of the bottom dead center of the upper die 22, the finished amount of enlargement of the billet 2 and the final length of the enlarged portion are determined. It is noted, however, that the amount of enlargement of the billet 2 is also restricted by contact with the opening-side cavity portion of the die cavity 13 of the lower die 12. In this manner, it is possible to form the upset blank 3 in which, at opposite end portions, the cross-sectional size of the billet 2 is maintained, and, at the intermediate region excluding the opposite end portions, the cross-sectional area is uniformly enlarged, as shown in FIG. 6(c).

Figure 7:
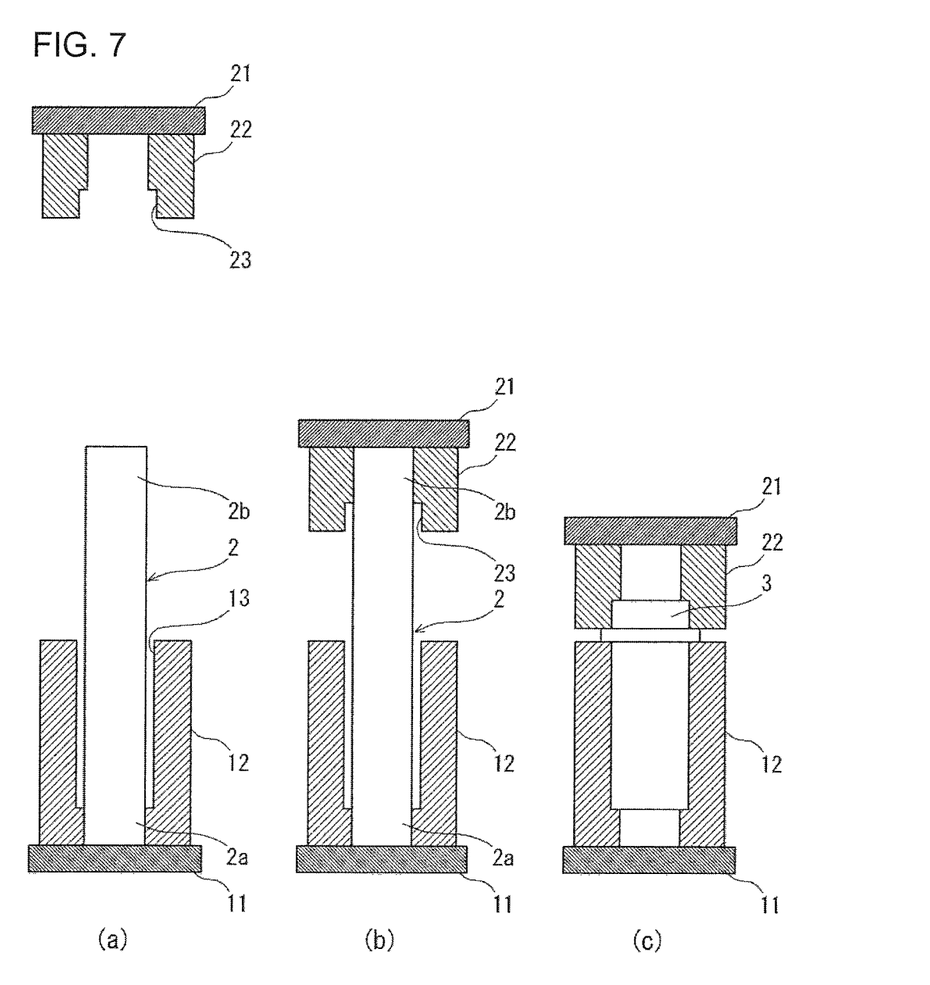
FIG. 7 is a diagram schematically showing another example of an upsetting operation in a method of manufacturing a die forged crankshaft according to the present invention.

FIG. 7 is a diagram schematically showing another example of an upsetting operation in a method of manufacturing a die forged crankshaft according to the present invention. The upsetting operation illustrated in FIG. 7 is intended to form the upset blank 3 shown in FIG. 4 having two stages of enlarged cross sectional areas.

The upsetting operation shown in FIG. 7 differs from the upsetting operation shown in FIG. 6 in that the die cavity 23 of the upper die 22 is also a stepped cavity having a bottom-side cavity portion and an opening-side cavity portion similarly to the die cavity 13 of the lower die 12. In this case, as shown in FIG. 7(b), one end portion 2a of the billet 2 is restrained by the bottom-side cavity portion of the die cavity 13 of the lower die 12 and the other end portion 2b of the billet 2 is restrained by the bottom-side cavity portion of the die cavity 23 of the upper die 22, and in this state, as the upper die 22 is further lowered, the region of the billet 2 excluding both the end portions 2a, 2b, which are restrained, is compressed in the longitudinal direction and accordingly enlarged.

In this operation, the amount of enlargement of the billet 2 is restricted, first by contact with the opening-side cavity portion of the die cavity 13 of the lower die 12 and contact with the opening-side cavity portion of the die cavity 23 of the upper die 22. Then, with the adjustment of the bottom dead center of the upper die 22, the billet 2 expands from between the parting surfaces of the lower die 12 and the upper die 22 that oppose each other, and the finished amount of enlargement of the portion and the final length of the enlarged portion are determined while, at the same time, the final length of the enlarged portion as a whole is determined. In this manner, it is possible to form the upset blank 3 in which, at opposite end portions, the cross-sectional size of the billet 2 is maintained, and, at the intermediate region excluding the opposite end portions, the cross-sectional area is enlarged in two stages, as shown in FIG. 7(c).

An issue to be addressed regarding the upsetting operation described in the above is buckling of the billet. This is because, in the method of manufacturing a die forged crankshaft of the present invention, a long billet is subjected to an enlargement operation over a wide range in the longitudinal direction, and therefore there is a concern that buckling thereof might occur. If buckling occurs, it is impossible to obtain an upset blank having a desired shape and size. Therefore, it is preferred that experiments are conducted under various conditions in advance, and that, for example, when a round billet is used, threshold conditions for the occurrence of buckling are ascertained from the relationship between the diameter expansion ratio "$D_0/D_1$" represented by the ratio of the diameter $D_0$ of the billet to the diameter $D_1$ of the enlarged portion after the upsetting operation and the slenderness ratio "$L_f/D_0$" represented by the ratio of the free length $L_f$ of the billet to the diameter $D_0$ of the billet, as shown in FIG. 6, and that the conditions for the upsetting operation are specified based on the relationship.

The present invention is not limited to the embodiments described above, and various modifications may be made without departing from the spirit and scope of the present invention. For example, the configuration of the upset blank is not limited to one having an intermediate region that is uniformly enlarged in cross-sectional area, but may be one having an intermediate region that is gradually enlarged in cross-sectional area.

INDUSTRIAL APPLICABILITY

The present invention is capable of being effectively utilized in manufacturing a die forged crankshaft to be mounted in a two or more cylinder reciprocating apparatus, particularly in manufacturing a die forged crankshaft to be mounted in a multiple cylinder engine for automobiles.

REFERENCE SIGNS LIST

| | | |
|---|---|---|
| 1: die forged crankshaft, | J1 to J5: journals | |
| P1 to P4: crank pins, | Fr: front part, | Fl: flange |
| A1 to A8: crank arms, | 2: billet, | |
| 2a: one end portion, | 2b: the other end portion, | 3, 4, 5: upset blank, |
| 6: block forged blank, | 6a: flash, | |
| 7: finish forged blank, | 7a: flash, | |
| 11: pressure pad, | 12: lower die, | 13: die cavity, |
| 21: pressure pad, | 22: upper die, | 23: die cavity |

What is claimed is:

1. A method of manufacturing a die forged crankshaft to be mounted in an at least two cylinder reciprocating apparatus, the method comprising:
    an upsetting step that includes upsetting a billet having a constant cross-sectional area along an entire length thereof to form a blank having a uniformly enlarged cross-sectional area at a region between a portion to be formed into a leading crank arm of the crankshaft and a portion to be formed into a trailing crank arm of the crankshaft;
    a die forging step that includes die forging the blank formed in the upsetting step to form a forged blank having a shape of the crankshaft with a flash; and
    a trimming step that includes trimming the flash from the forged blank formed in the die forging step.

2. The method of manufacturing a die forged crankshaft according to claim 1, further comprising:
    a preforming step prior to the die forging step, the preforming step including: partially pressing the blank in accordance with the shape of the crankshaft and distributing a volume of the blank at least in a longitudinal direction thereof and a direction perpendicular to the longitudinal direction.

3. The method of manufacturing a die forged crankshaft according to claim 1,
    wherein the crankshaft includes a disc-shaped crank arm that is coaxial with the central axis of the crankshaft, and, the upsetting step is performed in such a manner that the blank has a portion to be formed into the disc-shaped crank arm, the portion having a further enlarged cross sectional area.

4. The method of manufacturing a die forged crankshaft according to claim 3, further comprising:
a preforming step prior to the die forging step, the preforming step including: partially pressing the blank in accordance with the shape of the crankshaft and distributing a volume of the blank at least in a longitudinal direction thereof and a direction perpendicular to the longitudinal direction.

* * * * *